United States Patent
Yoshino

(10) Patent No.: US 9,283,508 B2
(45) Date of Patent: Mar. 15, 2016

(54) FILTER ELEMENT

(71) Applicant: ROKI CO., LTD., Hamamatsu-shi, Shizuoka (JP)

(72) Inventor: Hotaka Yoshino, Hamamatsu (JP)

(73) Assignee: ROKI CO., LTD., Hamamatsu-shi (JP)

( * ) Notice: Subject to any disclaimer, the term of this patent is extended or adjusted under 35 U.S.C. 154(b) by 58 days.

(21) Appl. No.: 14/132,682

(22) Filed: Dec. 18, 2013

(65) Prior Publication Data

US 2014/0174046 A1 Jun. 26, 2014

(30) Foreign Application Priority Data

Dec. 21, 2012 (JP) ................. 2012-279893

(51) Int. Cl.
*B01D 46/52* (2006.01)
*B01D 46/00* (2006.01)
*B01D 39/16* (2006.01)

(52) U.S. Cl.
CPC .......... *B01D 46/521* (2013.01); *B01D 39/1623* (2013.01); *B01D 46/0002* (2013.01); *B01D 46/0005* (2013.01); *B01D 46/523* (2013.01)

(58) Field of Classification Search
CPC .. B01D 46/0005; B01D 46/10; B01D 46/521; B01D 46/523; B01D 46/0002
See application file for complete search history.

(56) References Cited

U.S. PATENT DOCUMENTS

| | | | |
|---|---|---|---|
| 6,846,342 B2 * | 1/2005 | Mertz et al. | 55/486 |
| 7,300,486 B1 * | 11/2007 | Kirsch | 55/502 |
| 2010/0304232 A1 * | 12/2010 | Huecker et al. | 429/410 |

FOREIGN PATENT DOCUMENTS

JP 10-263348 A 10/1998

* cited by examiner

*Primary Examiner* — Robert Clemente
(74) *Attorney, Agent, or Firm* — Sughrue Mion, PLLC

(57) ABSTRACT

A filter element includes: a filter member formed of a non-woven fabric formed by laminating a plurality of non-woven fabric layers and folding the thus formed non-woven fabric in form of pleat having a predetermined size along a width direction of the filter member; a holder frame formed of a soft material and disposed along an outer peripheral edge of the filter member, the holder frame being constituted by first and second frame members; and a reinforcing member having one end connected to the first frame member disposed along the width direction of the holder frame and having another end formed as a free end free from connection. The reinforcing member extends so as to intersect the width direction of the filter member.

5 Claims, 2 Drawing Sheets

FILTER ELEMENT

CROSS-REFERENCE TO RELATED APPLICATION

This application relates to and claims the benefit of priority from Japanese Patent Application number 2012-279893, filed on Dec. 21, 2012 the entire disclosure of which is incorporated herein by reference.

BACKGROUND OF THE INVENTION

1. Field of the Invention

The present invention relates to a filter element, and more particularly, to a filter element applicable to an air cleaner mounted to an internal combustion engine, for example.

2. Related Art

There is known, in a conventional technology, a filter element provided with a filter member that is formed by pleating a non-woven fabric (unwoven cloth) or filter paper along a width direction thereof and a holder frame that holds or supports an outer edge portion of the filter member.

As a prior art patent document, there is provided, for example, Japanese Patent Laid-open Publication No. HEI 10-263348 (Patent Document 1). A filter element disclosed in this Patent Document 1 is a filter element that is provided with a filter member and a holder frame that holds the filter member, and a packing is formed, by an injection molding, integrally with a peripheral portion of the holder frame.

As mentioned above, the filter element of the Patent Document 1 is formed integrally with the packing through the injection molding process at the peripheral portion of the holder frame, so that packing fitting working is eliminated and the number of members to be used is also reduced, which contributes to improvement in assembling workability and manufacturing cost saving.

By the way, the holder frame of the conventional filter element of the kind mentioned above is formed of a synthetic resin (such as polypropylene or nylon) having thermoplastic property. Specifically, the holder frame is preferably formed of a thermoplastic elastomer because the packing is formed at the peripheral portion of the holder frame.

Moreover, the filter element disclosed in the Patent Document 1 has a rib for reinforcing the holder frame in series along the longitudinal direction thereof. Such rib attains a function, in addition to the function of reinforcing the holder frame, of keeping and holding distance between adjacent gathers of the pleated filter member to prevent reduction of filtering area due to contacting and sticking of the adjacent gathers of the pleated filter member.

With the filter element of the structure mentioned above, in a case where a laminated non-woven fabric formed of a plurality of non-woven fabric layers bonded together as the filter member is used, if the holder frame is formed of a soft material such as thermoplastic elastomer, an external force will be applied concentrically to an end portion of the filter member when the filter element is intentionally twisted or bent. In such case, the end portion will be deformed, resulting in displacement of the end portion which may leads to separation or peel-off of the bonded laminated non-woven fabric layers or also to separation between the non-woven fabric and the holder frame, thus providing undesirable matter.

SUMMARY OF THE INVENTION

The present invention was conceived in consideration of the circumstances encountered in the prior art mentioned above, and an object thereof is to provide a filter element using a filter member formed of a non-woven fabric composed of a plurality of bonded laminated non-woven fabric layers, which is capable of preventing the separation or peel-off between the non-woven fabric layers, and/or between the non-woven fabric and the holder frame, made of soft material, of the filter element even if an external force is intentionally applied to the holder frame, as well as preventing increase in ventilation resistance.

The filter element of the present invention, in order to achieve the above object, includes: a filter member formed of a non-woven fabric formed by laminating a plurality of non-woven fabric layers and folding the thus formed non-woven fabric in form of pleat having a predetermined size along a width direction of the filter member; a holder frame formed of a soft material and disposed along an outer peripheral edge of the filter member, the holder frame being constituted by first and second frame members; and a reinforcing member having one end connected to the first frame member disposed along the width direction of the holder frame and having another end formed as a free end free from connection, the reinforcing member extending so as to intersect the width direction of the filter member.

In the embodiment of the above present invention, the following preferred modes may be provided.

It may be preferred that the holder frame is composed of a pair of first frame members and a pair of second frame members, and at least one pair of reinforcing members are formed in a manner that one ends of the respective reinforcing members are connected to the first frame members.

It may be preferred that the respective reinforcing members have the other ends formed as free ends opposed to each other.

It may be preferred that each reinforcing member extends from the first frame member over at least three mount portions of pleated portion of the filter member.

It may be also preferred that the holder frame and the reinforcing member are formed of a same soft material integrally with each other.

It may be further preferred that the soft material is a thermoplastic elastomer.

Further, it is to be noted that the above embodiment and preferred modes thereof do not provide all the essential features of the present invention, and for example, sub-combination of these modes may constitute the invention.

According to the filter element of the present invention of the structures mentioned above, the following advantageous effects can be provided.

Since the filter element is provided with the reinforcing member having one end connected to the first frame member disposed along the width direction of the holder frame and having another end formed as a free end free from connection, the reinforcing member extending so as to intersect the width direction of the filter member. Accordingly, the separation or peel-off between the non-woven fabric layers of the end portion of the filter member and between the non-woven fabric and the holder frame can be effectively prevented.

Furthermore, in the filter element according to the present invention, since at least one pair of reinforcing members are formed in a manner that one ends of the respective reinforcing members are connected to the first frame members, the layer separation or peel-off at the end portion of the filter member and the separation or peel-off between the non-woven fabric and the holder frame can be prevented.

Furthermore, in the filter element according to the present invention, since the respective reinforcing members have the other ends formed as free ends opposed to each other, the larger filtrating area can be ensured and the reinforcement of the end portion of the filter member can be also achieved.

Still furthermore, in the filter element according to the present invention, since each reinforcing member extends from the first frame member over at least three mount portions of pleated portion of the filter member, the larger filtrating area can be ensured without increasing ventilation resistance.

Still furthermore, in the filter element according to the present invention, since the holder frame and the reinforcing member are formed of the same soft material integrally with each other, the number of parts or members for construction can be reduced, thereby reducing or suppressing manufacturing cost.

Still furthermore, in the filter element according to the present invention, since the soft material is the thermoplastic elastomer, the holder frame and the reinforcing member can be integrally formed by the injection molding process and also performing the insert-molding of the filter member to the holder frame and the reinforcing member.

The nature and further characteristic features of the present invention will be made clearer from the following descriptions made with reference to the accompanying drawings.

DESCRIPTION OF THE PREFERRED EMBODIMENT

Hereunder, a preferred one embodiment of the present invention will be described with reference to the accompanying drawings.

It is to be noted that the following embodiment is not limited to the invention defined by appended claims, and all the combination of the subject features of the present embodiment described herein is not essential for the solution of the present invention.

Figure 1:
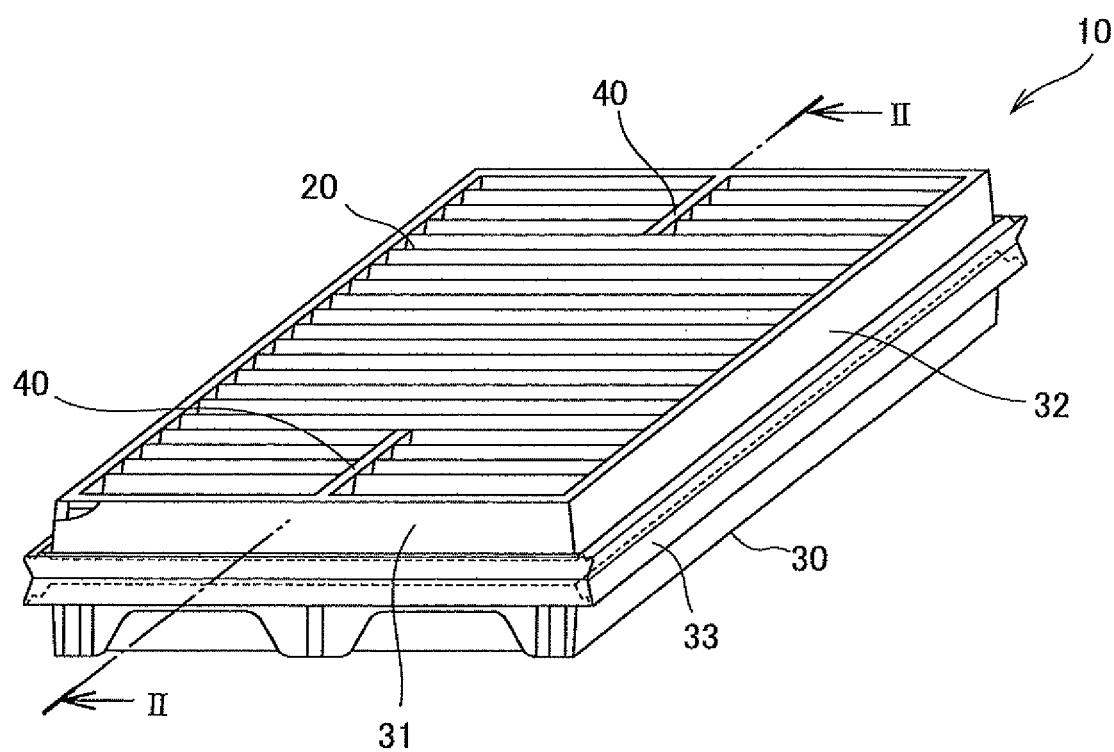
FIG. 1 is a perspective view illustrating an outer configuration or structure of a filter element according to an embodiment of the present invention.
Figure 2:
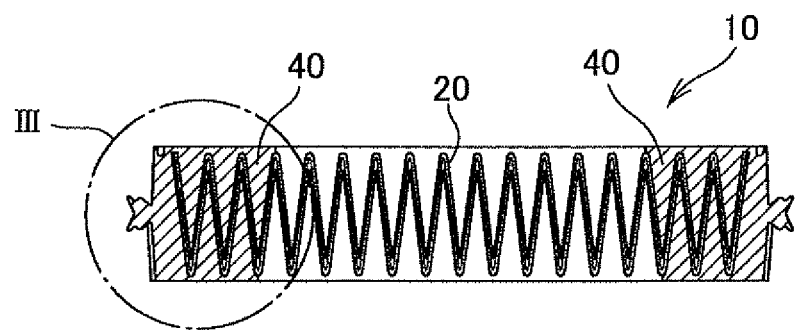
FIG. 2 is a sectional view taken along the line II-II in FIG. 1.

With reference to FIG. 1 showing a filter element according to one embodiment of the present invention, the filter element 10 is provided with filter member 20 and a holder frame 30 holding and supporting the filter member 10 so as to surround the outer periphery of the filter member 10.

The filter member 20 is formed of a sheet-shaped non-woven fabric which is pleated in a fashion such that predetermined mount portions and valley portions of the pleated structure are alternately arranged along the width direction of the non-woven fabric. The holder frame 30 is composed of a pair of first frame members 31 formed along the width direction of the filter member 20 and a pair of second frame members 32 formed along the longitudinal direction of the filter member 20.

Figure 3:
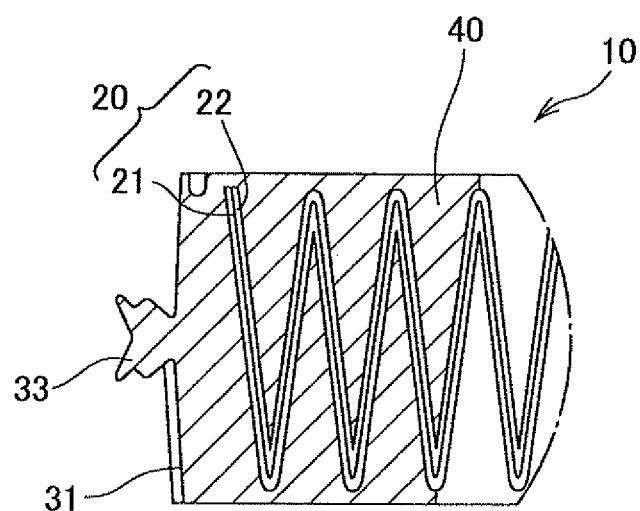
FIG. 3 is an enlarged view of an encircled portion III in FIG. 2.

The filter member 20 is a laminated non-woven fabric formed, as shown in FIG. 3, by laminating and bonding a rough layer 21 positioned on a dust side and a tight (dense) layer 22 positioned on a clean side. When the filter element 10 is disposed in an air cleaner, the filter element 10 sections the interior of the air cleaner into a dust side and a clean side.

When a fluid passes dust side in the air cleaner, the filter 20 filtrates the fluid, and the filtrated fluid is sent to the clean side.

In this operation, since the filter member 20 is pleated (folded so as to provide pleats), the filtering area can be increased to thereby improve filtrating performance as well as to reduce ventilation resistance.

Around the holder frame 30, is formed a seal portion 30 which is integrally formed with the first frame members 31 and the second frame members 32, and the dust side and the clean side are sealed from each other in the interior of the air cleaner. Further, it is to be noted that the filter element 10 of the present embodiment has a rectangular structure having a width side length smaller than a longitudinal side length, and according to such structure, the adjacent gathers of the pleated fabric of the filter member 20 are hardly stuck to each other.

Furthermore, reinforcing members 40 are formed so as to extend from the inner peripheral side of the first frame members 31 respectively in the manner such that one end of each of the reinforcing members 40 is connected to the inside portion of the first frame member 31 and the other one end thereof is formed as a free end free from connection so as to intersect the width direction of the holder frame 30 and the other free ends of the respective reinforcing members 40 are opposed to each other inside the holder frame 30 as shown in FIG. 1.

Each reinforcing member 40 is formed so as to extend, as shown in FIG. 3, over at least three mount portions of the pleated filter member 20. As mentioned above, since the other end portions of the paired reinforcing members 40 are formed as opposed free end portions, the larger filtrating area of the filter member 20 can be ensured and can reduce the ventilation resistance in comparison with the structure in which a single reinforcing member is formed entirely in and along the longitudinal direction of the holder frame 30, thus being advantageous.

Further, since the holder frame 30 and the reinforcing members 40 are formed of a soft material, the filter member 20 can be formed by an insert-molding process and the reinforcing members 40 and the seal portion 30 can be also formed integrally with each other by the injection molding process.

As such soft material, a thermoplastic elastomer having elasticity like that of vulcanized rubber may be preferably used, and more specifically, styrene series thermoplastic elastomer; olefin series thermoplastic elastomer; urethane series thermoplastic elastomer; polyester series thermoplastic elastomer; polyamide series thermoplastic elastomer; 1,2-polybtajien series thermoplastic elastomer, vinyl-chloride series thermoplastic elastomer; or fluorine series thermoplastic elastomer may be used. These thermoplastic elastomers are formed by the injection molding machine, which does not require any vulcanizing treatment different from rubber. Accordingly, these thermoplastic elastomers are preferred as materials for integrally forming the holder frame 30, the reinforcing member 40 and the seal member 33 by the injection molding process.

As described above, according to the filter element of the present embodiment, the other ends of the paired opposing reinforcing members 40 are formed as free end portions, which are not connected to each other. Therefore, even in a case where the filter member 20 is formed of a plurality of laminated non-woven fabric layers and the holder frame 30 is formed of the soft material, the lamination-separation or lamination-peel-off at the end portion of the filter member 20 or the separation or peel-off between the non-woven fabric and the holder frame can be prevented, and in addition, the larger filtrating area of the filter member 20 can be ensured and can reduce the ventilation resistance in comparison with the structure in which a single reinforcing member is formed entirely in and along the longitudinal direction of the holder frame 30, thus being advantageous.

In the filter element according to the described embodiment, although the filter member 20 is formed of the non-woven fabric composed of the laminated rough layer 21 and tight layer 22, the lamination manner of the filter element is not limited to this manner, and for example, a laminated non-woven fabric formed by a fusion treatment using heat or ultrasonic wave or needle-punch method may be used.

Furthermore, in the filter element according to the described embodiment, although one pair of reinforcing members 40 are formed, the number of the reinforcing member is not limited to such structure, and tow or more than two pairs of the reinforcing members may be formed for a filter element having a wide width or a filter element having large size. In such structures, it may be preferred to prevent the adjacent pleated portions from sticking from each other by forming a center rib in series properly in the longitudinal direction in a manner such that the opening width of the filter member is less than the longitudinal length in accordance with the width dimension of the filter element.

Still furthermore, it may be possible to form a single reinforcing member 40 having one end connected to the first frame member and the other end free from connection, or the opposed free ends of the paired reinforcing members may be arranged in offset manner.

It will be apparent that such alternated motes or other modified modes may be within technical scope of the present invention defined in the appended claims.

What is claimed is:

1. A filter element comprising:
   a filter member formed of a non-woven fabric formed by laminating a plurality of non-woven fabric layers and folding the thus formed non-woven fabric in form of pleat having a predetermined size along a width direction of the filter member;
   a holder frame formed of a soft material and disposed along an outer peripheral edge of the filter member, the holder frame being constituted by first and second frame members; and
   a reinforcing member having one end connected to the first frame member disposed along the width direction of the holder frame and having another end formed as a free end free from connection, the reinforcing member extending so as to be parallel to the second frame member formed along a longitudinal direction of the filter member,
   wherein the holder frame is composed of a pair of first frame members and a pair of second frame members, and at least one pair of reinforcing members are formed in a manner that one ends of the respective reinforcing members are connected to the first frame members, and
   wherein the reinforcing member is discontinuous with the second frame members.

2. The filter element according to claim 1, wherein the respective reinforcing members have the other ends formed as free ends opposed to each other.

3. The filter element according to claim 1, wherein each reinforcing member extends from the first frame member over at least three mount portions of pleated portion of the filter member.

4. The filter element according to claim 1, wherein the holder frame and the reinforcing member are formed of a same soft material integrally with each other.

5. The filter element according to claim 1, wherein the soft material is a thermoplastic elastomer.

* * * * *